United States Patent [19]

Best

[11] 4,283,232
[45] Aug. 11, 1981

[54] PROCESS AND APPARATUS FOR USE IN TREATING MATERIALS IN HYDROCYCLONES

[75] Inventor: Ijsbrand Best, Bergen, Netherlands

[73] Assignee: Wessanen Nederland B.V., Amstelveen, Netherlands

[21] Appl. No.: 42,601

[22] Filed: May 23, 1979

[30] Foreign Application Priority Data

May 24, 1978 [GB] United Kingdom ............... 22187/78

[51] Int. Cl.³ .............................................. C13L 1/00
[52] U.S. Cl. ...................................... 127/71; 127/25; 127/27; 209/211
[58] Field of Search .............................. 127/27, 69–71; 210/512 R, 512 M, 195.1; 209/211

[56] References Cited

U.S. PATENT DOCUMENTS

| 3,235,090 | 2/1966 | Bose et al. ....................... 210/512 R |
| 4,141,747 | 2/1979 | Best ........................................ 127/32 |
| 4,144,087 | 3/1979 | Chisalek et al. ...................... 127/69 |

FOREIGN PATENT DOCUMENTS

| 1120588 | 7/1956 | France ....................................... 127/69 |
| 611284 | 10/1960 | Italy ...................................... 210/195.1 |

OTHER PUBLICATIONS

Die Staerke, vol. 15, (1963), No. 10, S. Bednarski; "Hydrozyklone in der Stärkeindustrie", pp. 371–382.

Primary Examiner—Michael S. Marcus
Attorney, Agent, or Firm—Cushman, Darby & Cushman

[57] ABSTRACT

In apparatus comprising a plurality of hydrocyclone stages connected in cascade as a totally enclosed system, for use in the upgrading of starch or other particulate feedstock, there is provision for recycling part of the underflow stream from the final hydrocyclone stage to the preceding stage.

4 Claims, 3 Drawing Figures

PROCESS AND APPARATUS FOR USE IN TREATING MATERIALS IN HYDROCYCLONES

It is known to employ hydrocyclones in the treatment of particulate feedstock for the purpose of removing impurities or relatively low grade substances (hereafter generically referred to as "contaminants"). Such contaminants may for example be present in solution in a liquid medium in which the particulate feedstock is suspended, and/or they may be present as undissolved solid particles.

According to one commonly used procedure, use is made of a plurality of hydrocyclone stages arranged in series or cascade for performing a continuous countercurrent washing process. The particulate feedstock together with the liquid medium which contains dissolved contaminants is fed into the first hydrocyclone stage and fresh liquid is continuously fed into the last stage. The underflow stream from each stage save the last feeds into the next stage and the overflow stream from each stage save the first feeds into the preceding stage. Each hydrocyclone stage may comprise a single hydrocyclone or a plurality of hydrocyclones connected in parallel.

The term "underflow" and "overflow" as used in this specification are terms of art used to denote the fractions discharging from different discharge apertures of a hydrocyclone, the term "underflow" being applied to the fraction discharging from the aperture through which all or the majority of the solid particles discharge when the hydrocyclone is operating as a thickener for thickening a solids/liquid suspension. In the normal orientation of a hydrocyclone that discharge aperture is disposed at the bottom. Hence the term "underflow". However the terms "underflow" and "overflow" do not necessarily indicate the spatial relationship of the apertures through which such fractions discharge because a hydrocyclone will operate in any orientation and its underflow discharge aperture can therefore be below its overflow discharge aperture or vice versa.

In some industrial installations of that general kind the underflow streams from the hydrocyclone stages preceding the last stage discharge into open vessels in which, during operation, a constant liquid level exposed to atmosphere is maintained, and pumps are provided for continuously pumping material from such vessels to the next washing stages.

In contrast to such open-type installations there are those in which the successive hydrocyclone stages are in closed communication via connecting conduits. Each conduit for conveying the underflow from one hydrocyclone stage to a following stage incorporates a pump for establishing the requisite feed pressure to that following stage. Each conduit for conveying overflow from one hydrocyclone stage to a preceding hydrocyclone stage leads to the inlet side of the pump feeding that preceding hydrocyclone stage. The series of hydrocyclone stages function interdependenly, there being as it were no flexible links in the chain. The hydrocyclone stages and the interconnecting conduits and pumps form what is referred to as a totally enclosed system.

An important factor in the economy of plants employing hydrocyclones for continuous countercurrent washing of starch and other particulate feedstocks is the quantity of water which is used in achieving a given upgrading of the product. There is a continuing need for ways whereby the consumption of uncontaminated water in such plants can be reduced.

There is also a need for an improvement in the known hydrocyclone plants in regard to the facility with which stable operating conditions resulting in a product of required quality can be established for various processing capacities of the plant. The start-up or so-called trimming period is, for many of the known industrial plants, rather long.

It is an object of the present invention to provide an apparatus and process which contribute towards meeting the foregoing needs.

According to the present invention there is provided an apparatus for use in the upgrading of particulate feedstock by removing (a) contaminating substance or substances, such apparatus comprising a plurality of hydrocyclones connected in cascade with a feed pump to each stage, as a totally enclosed system, with means for conducting washing liquid into the last hydrocyclone stage, characterised in that there is a duct arranged for conducting a part of the underflow stream from the final hydrocyclone stage back into the system at a position between the inlet of the pump which feeds that last stage and the preceding hydrocyclone stage.

The invention is based on the discovery that partial recycling of the underflow stream from the final hydrocyclone stage in the manner referred to is of surprising benefit to the performance of a continuous countercurrent hydrocyclone installation of the kind in question. In general terms the installation is easier to trim and less wash liquid is required for effecting a given upgrading treatment.

The specified partial recycling involves a departure from the long established conventional practice. When using a conventional totally enclosed continuous countercurrent installation the feed conditions associated with the final hydrocyclone stage are unlike those of the earlier stage or stages inter alia in the respect that whereas the or each earlier stage is fed not only with an initial feedstock suspension or a suspension constituting the underflow stream from an earlier stage but also with suspension constituting the overflow stream from the following stage, the only particles entering the final stage are those contained in the underflow stream from the preceding stage. The balance of the feed to the final stage is made up entirely by fresh wash liquid. This circumstance does not apply when partial recycling of the final stage underflow stream takes place, using apparatus according to the invention. The improvements attributable to the invention are directly or indirectly attributable to that fact. However the invention is not dependent on any particular theory in explanation of its benefits.

For achieving the best results from an installation according to the invention in the treatment of a given feedstock it is of course necessary to adjust its operating conditions. The performance of the installation depends on a number of factors. The influence of the various parameters determining the operation of an installation according to the invention will be described later in this specification. By effecting partial recycling of the final underflow stream it is possible to achieve better results, and/or to achieve given results more easily or economically than would otherwise be possible.

The proportion of the final underflow stream which is recycled is one factor which influences results. The best proportion for a given set of other operating conditions can be determined by tests. Depending on circumstances, the most favourable value for the said proportion may for example be between 15% and 40% on a volume basis. These are not in any way limiting values. The best proportion is expected however to be from 5% to 50% in most if not all cases. Generally speaking, recycling of less than 5% is insufficient for achieving the full advantages hereafter described. Recycling of more than 50% is not worth while because any advantages tend to be outweighed by the higher power consumption for a given production capacity.

Assuming that the installation is only to be operated under a given set of conditions the proportion of the final underflow stream which is recycled, once it has been selected, need not be varied in any way. Preferably however the apparatus includes flow control means whereby the proportion of the underflow stream which is recycled can be adjusted. The flow control means may e.g. consist of or include a manually or automatically actuatable control valve or a metering pump in association with the said recycling duct. In practice of course flow regulators will also be provided whereby the volume flow rates of other streams, including the volume flow rate of the overflow stream from the first hydrocyclone stage, the wash liquid entering the final stage and the underflow stream from the final stage can be adjusted.

Apparatus according to the invention are of important potential use for treating feedstock of a variety of different kinds. Examples of such feedstocks are starches and sand. The adoption of a totally enclosed system makes it feasible to process volatile, slightly inflammable and/or toxic substances.

The invention is primarily intended for application to totally enclosed continuous countercurrent washing installations for use in freeing a particulate feedstock from dissolved contaminants contained in a liquid vehicle in which the feedstock is suspended, and possibly at the same time removing insoluble contaminating particles from the feedstock. Potentially the most important field of use is the countercurrent washing of starch, e.g. potato starch or corn starch. However the invention can also be applied to installations for removing or reducing the concentration of solid insoluble contaminants from a particulate feedstock by classification of the particles in the feedstock, even in cases where the problem of removing dissolved contaminants is not involved. For example apparatus according to the invention can be used for treating sand to remove adherent insoluble contaminants of relatively low settling rates.

The benefits of the invention are most marked when it is applied to installations incorporating multiple hydrocyclones in parallel in each washing stage and in preferred installations according to the invention the successive stages are of such multihydrocyclone type. Also the invention is mainly but not exclusively concerned with apparatus for treating feedstocks comprising small particles, say particles less than 100 microns in size, and in particular with apparatus for treating feedstocks comprising very small particles less than 30 microns in size. For washing such very small particles hydrocyclones of very small size are required. In preferred embodiments of the invention each of the hydrocyclone stages comprises a multihydrocyclone incorporating hydrocyclones less than 2 cm in diameter. The hydrocyclones can be formed as known per se by a moulding process. For example a multi-hydrocyclone can comprise a moulded block having hydrocyclone chambers communicating with a common feed channel, and a cover component which closes off the said chambers and channel and has apertures for passing the overflow streams from the chambers.

The most advantageous embodiments are those wherein the different hydrocyclone stages are of substantially the same throughout capacity and have feed pumps suitable for maintaining substantially equal pressure drops over the different stages. Optimally the different stages contain the same number of cyclones and the cyclones are identical from stage to stage. Highly efficient processing by means of identical hydrocyclone stages is made possible by the step of recycling part of the final underflow stream in the manner hereinbefore referred to.

A disadvantage of the previously known installations is that if the dynamic balance of the stystem is disturbed by incidental changes in ambient conditions the restoration of the balance generally takes an appreciable time and meanwhile output quality is adversely affected. Also, generally speaking, the known installations are very difficult to trim, by which is meant that the establishment of operating pressures and flow rates which give at least the minimum acceptable results is very time consuming. In order to achieve results of an acceptable standard it has hitherto been considered desirable to make the different hydrocyclone stages of different throughput capacity. However, the disparity in the designed throughput capacites of different hydrocyclone stages magnifies the complexity of the operations in the system and tends to increase the difficulties of trimming.

By contrast, when using an apparatus according to the invention having identical hydrocyclone stages ease of trimming is further promoted and if the dynamic balance is temporarily disturbed, the balance becomes restored more quickly. Another advantage is that a given upgrading treatment can be performed using a smaller number of hydrocyclones and with a smaller power consumption and less wash liquid.

The invention includes a process of removing contaminants from a feedstock comprising solid particles in a liquid medium, using a plurality of hydrocyclone stages connected in cascade with a feed pump to each stage, forming a totally enclosed system, the said particles and liquid medium being continuously fed to the first stage and fresh liquid being continuously fed into the last stage, characterised in that a proportion of the underflow stream from the final hydrocyclone stage is continuously recycled to the inlet side of the pump feeding that stage.

The advantage of such a process will be appreciated from what has previously been written concerning apparatus according to the invention.

In preferred processes according to the invention the throughput capacities of the different hydrocyclone stages are substantially the same and the pressure drops across the different stages are likewise substantially equal.

For achieving the best results the volume flow rates of the streams of material flowing into and from the system should be such that the system is substantially free from internal cavitation and is in dynamic equilibrium. Operation in equilibrium means that pressures at different points of the system are free from haphazard fluctuations and the performance is therefore steady.

Particular importance is given to processes according to the invention wherein the particulate feedstock is suspended in a liquid containing dissolved contaminant(s) and the process is performed for obtaining an uncontaminated or much less contaminated end product. For this purpose the feestock is washed in the hydrocyclone installation in countercurrent with pure or relatively pure liquid. A very important example is the continuous countercurrent washing of starch in a starch refining and processing plant.

In any such countercurrent washing process a very important factor is the overall dilution factor, which will be referred to in more detail later in this specification and is a measure of the extent to which the concentration of dissolved contaminants becomes reduced in the washing treatment. By using a process according to the invention overall dilutions can be achieved which are appreciably in excess of what is possible when using a previously known conventional washing apparatus of the same throughput capacity.

In the continuous countercurrent washing of starch and other substances using hydrocyclones, it is often desirable simultaneously to remove a fraction of relatively low settling rate insoluble particles which are present in the initial feedstock or occur as a result of attrition in the hydrocyclone installation, such particles being categorised as "contaminants" because they would lower the grade of the final product if they were present therein. This result can easily be achieved in carrying out the present invention. The process is for example performed so that the overflow stream from each stage has a sufficient solids concentration to ensure effective removal of the said insoluble contaminants from its feed stream. The said proportion is the same from stage to stage.

The partial recycling of part of the final stage underflow stream makes up for a deficiency of solids which would otherwise occur in the system and which is believed to be largely responsible for cavitation and dynamic imbalance in the operation of conventional installations. The aforesaid partial recycling moreover has the important result that a given upgrading treatment can be performed with a lower consumption of washwater and by means of a smaller capacity apparatus.

The upgrading treatment according to the invention can be preceded by a pre-classification step or steps as known per se for removing particles below a certain size or settling rate from the feedstock.

Certain embodiments of the invention, selected by way of example, will now be described with reference to the accompanying diagrammatic drawings in which.

Figure 1:
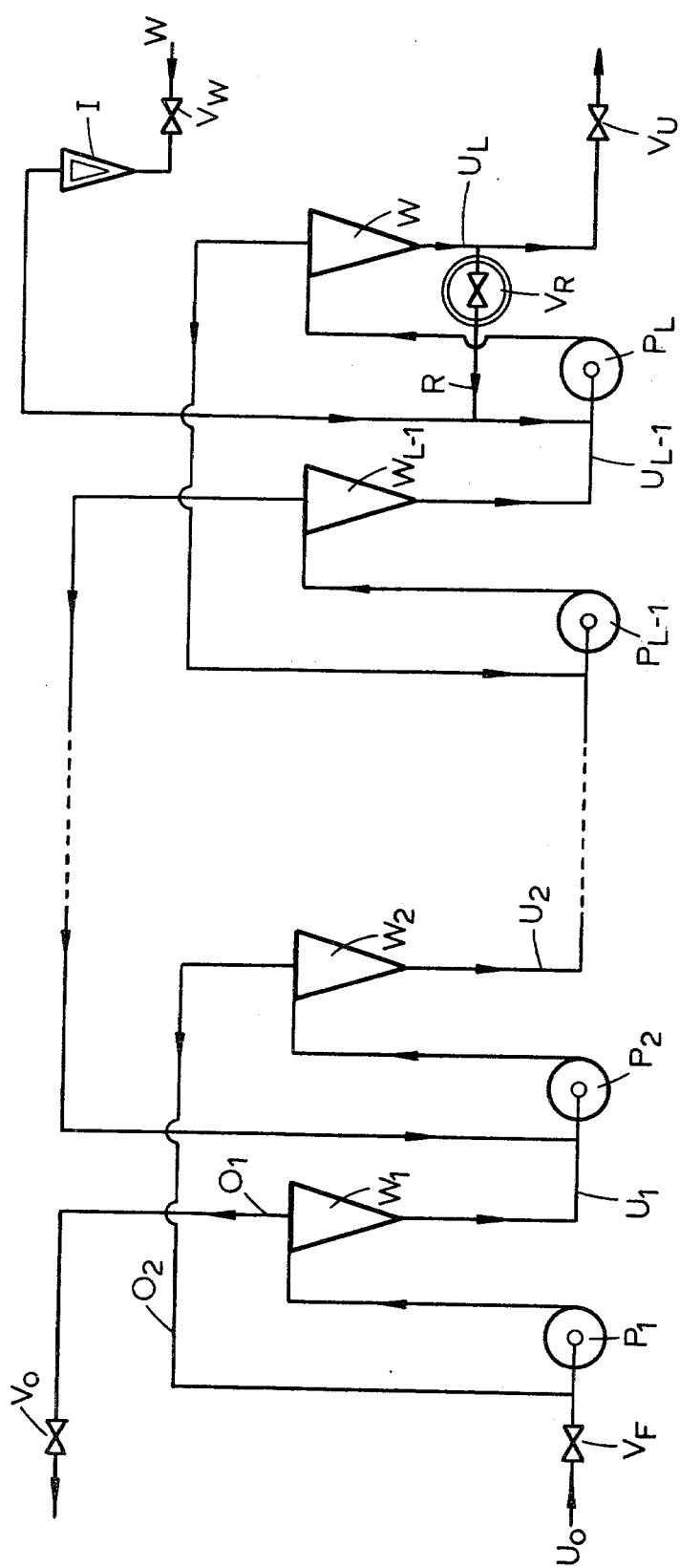
FIG. 1 is a flowsheet representing an installation according to the invention.

The installation which is the subject of FIG. 1 comprises a plurality of washing stages $W_1$ through to $W_L$ ("L" denoting "last"). Each stage is represented by a single conical hydrocyclone. While the invention does include installations wherein there is only one hydrocyclone per stage, the single cone at each stage in the flowsheet in fact stands for a multihydrocyclone comprising a plurality of individual hydrocyclones connected for feeding in parallel via a common feed conduit. The successive hydrocyclone stages are fed by pumps $P_1$ through to $P_L$.

The feedstock $U_o$ to the washing installation comprises particles entrained in a liquid medium containing dissolved contaminants. This feedstock is in fact the underflow stream from a preceding classification stage (not shown) which may e.g. employ one or more hydrocyclone classifiers or a centrifuge. It is important for the feedstock to be supplied to the first pump $P_1$ at constant pressure. This can be done e.g. by employing a constant head tank or by employing between a storage tank or other reservoir and the washing installation a pump and a standpipe affording a smaller exposure of the feedstock to atmosphere, the pump serving to maintain an overflow from the standpipe, which overflow can be recycled to the reservoir.

The feedstock $U_o$ is fed by pump $P_1$ into hydrocyclone stage $W_1$ together with the overflow stream $O_2$ from stage $W_2$. The material entering hydrocyclone stage $W_1$ is separated therein into an overflow current $O_1$ and an underflow current $U_1$.

The underflow stream from stage $W_1$ is fed by pump $P_2$ to stage $W_2$ together with the overflow stream from stage $W_3$ (not shown). This flow pattern persists throughout the system up to stage $W_{L-1}$. The feed to the last stage $W_L$ comprises the underflow stream $U_{L-1}$ and fresh wash liquid W which is fed into and mixed with the underflow stream $U_{L-1}$ at the inlet side of the last pump $P_L$. An upgraded product stream $U_L$ discharges from the last stage $W_L$. A switch valve $V_F$ permits admission of water from a pure water sump for start-up. Valves $V_O$, $V_W$ and $V_U$ are provided for regulating the flow of material streams into and from the system.

To that extent the flowsheet corresponds with the flowsheet of a known totally enclosed system countercurrent washing installation. The installation according to the invention differs from that known installation in that there is a return passageway R for conveying part of the underflow stream $U_L$ back into the system at the inlet side of the last stage pump $P_L$. The return passageway R is fitted with a control valve $V_R$ for flow regulation purposes.

In this particular embodiment of the invention the installation differs from the known conventional installations also in another respect, namely that the hydrocyclone stages are identical. In other words the stages comprise the same number of hydrocyclones and the hydrocyclones in all stages are identical. The stages are therefore of the same designed throughput capacity.

Moreover in this illustrative embodiment of the invention, the pumps $P_1$ through to $P_L$ maintain substantially equal pressure drops over the different stages. The relative flow rates of the material streams into and from the system and the volume split of the final stage underflow stream $U_L$ are regulated by the valves to establish steady performance conditions throughout the system with a setting of valve $V_R$ which gives the best washing efficiency.

There now follows a description of the performance of a process according to the invention, using an installation as represented in FIG. 1, for the purpose of upgrading a starch suspension by removing dissolved contaminants and also removing a fraction of relatively low settling ratio particles which would otherwise adversely affect the quality of the final product.

It should firstly be understood that the installation according to the invention functions as a refining tool. It is not designed for the primary treatment of highly contaminated material but for upgrading material which has been subjected to pretreatment leaving a residual quantity of solid contaminants which is very low in relation to the quantity of the valuable product. As an example the installation is very suitable for washing a starch suspension containing less than 1% by volume of solid contaminants.

Figure 2:
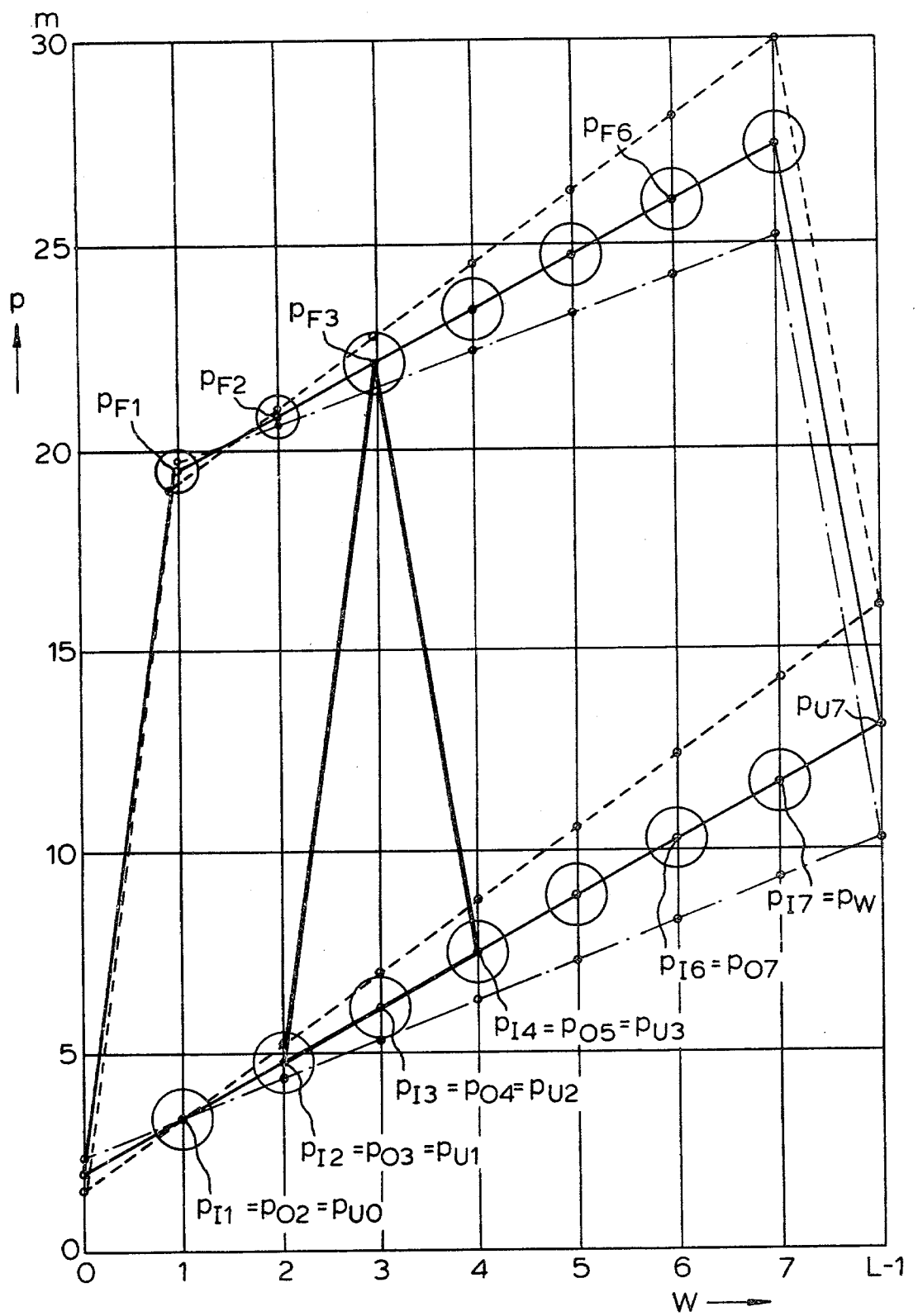
FIG. 2 is a pressure distribution graph.

FIG. 2 is a pressure distribution graph indicative of ideal pressure conditions in an installation as represented by the FIG. 1 flowsheet and incorporating seven washing stages $W_1$ through to $W_7$, when the installation is properly trimmed. Although these ideal conditions are unlikely to be fully realized in practice, the employment of the process according to the invention with its important recycling step, and the use of identical hydrocyclone stages, enable a much closer approximation to these ideal conditions than would otherwise be possible.

In the graph, pressures (p) denoted in meters of water column on the ordinate are plotted against the washing stage numbers. The pressures p which are plotted on the graph include the pressure at the inlet side of each of the pumps $P_1$ to $P_7$ and the feed pressures to the hydrocyclone stages, measured at the output sides of the pumps. To take stage $W_3$ as an example, point $P_{I3}$ denotes the pressure at the inlet side of the pump feeding that stage and point $P_{F3}$ denotes the pressure in the feed stream delivered by that pump to that hydrocyclone stage. The pressure at the inlet side of the pump $P_2$ is denoted by point $P_{I2}$ and the pressure at the inlet side of pump $P_4$ is denoted by point $P_{I4}$. Pressures $P_{I2}$ and $P_{I4}$ will correspond respectively with the pressure in the overflow stream from stage $W_3$ and the pressure of the underflow stream from stage $W_3$ respectively. Accordingly the pressure distribution over stage $W_3$ is represented by the triangle $P_{F3}$-$P_{I2}$-$P_{I4}$ in the graph. A similar pressure distribution line could be drawn for each of the washing stages.

The pressure at the inlet side of the pump $P_7$ feeding stage $W_7$ is equal to the pressure in the fresh water stream as measured by an instrument denoted I in FIG. 1, and that point $P_{I7}$ on the graph is therefore also marked $P_W$. Finally there is shown the pressure $P_{U7}$ of the final stage underflow stream (the stream denoted $U_L$ in FIG. 1).

A most important feature to be noted from the graph is the fact that in the ideal conditions the pressures at the inlet sides of the pumps and the feed pressures to the hydrocyclone stages lie on straight lines. This would correspond with a perfectly smooth performance of the installation.

Experiments with an installation according to the invention show that a close approximation to those conditions is possible and that the installation has a surprising flexibility in the sense that the operating processing capacity can be from 80% to 120% of the nominal processing capacity of the installation (corresponding with the full line conditions on the graph) while still performing in a smooth and balanced manner. The pressure distribution under the 80% and 120% nominal processing capacity conditions are represented by the broken lines and the chain lines respectively.

When performing a countercurrent washing process a very important parameter, as already briefly mentioned, is the overall dilution factor of the hydrocyclone installation. This factor is a measure of the extent of removal of the dissolved contaminants. The value of the overall dilution factor $c_O$ of a given installation is represented by the ratio:

$$c_O = \frac{\text{concentration of dissolved contaminants in the liquid fraction of the feed}}{\text{concentration of dissolved contaminants in the liquid fraction of the final stage underflow}}$$

The overall dilution factor of a given installation is inter alia a function of the number of hydrocyclone stages. A greater overall dilution factor can be achieved by increasing the number of washing stages in the installation design. The overall dilution factor is also a function of the so-called k value of the individual hydrocyclone stages. The k value, which in an installation according to the invention having identical hydrocyclone stages and operating in the preferred manner with substantially equal pressure drops across the different stages, is the same for all stages, denotes the volume relationship between the liquid quantities per unit time in the overflow and underflow streams, thus:

$$k = \frac{\text{volume of liquid in overflow stream}}{\text{volume of liquid in underflow stream}}$$

The overall dilution factor of a given installation can therefore be increased without adding to the number of hydrocyclone stages by taking steps to increase the k value of each hydrocyclone stage. This increase in the k value can be achieved by throttling the underflow streams from the individual hydrocyclone stages.

It is common practice for the individual hydrocyclones of the multihydrocyclone to discharge into overflow and underflow chambers common to all the individual hydrocyclones. Throttling of the common underflow stream can be achieved by means of a throttle or flow restrictor device, e.g. an orifice disc, located at the exit of the underflow chamber or at a downstream point, e.g. a position between that exit and the inlet to the pump feeding the next stage or, in the case of the final hydrocyclone stage, a position in a discharge conduit from that chamber.

The present invention includes installations and processes wherein such underflow throttling is employed. It will be appreciated that for achieving an approximation to the straight line pressure distribution characteristics exemplified by FIG. 2 it will be necessary for the throttling effect to be identical for all stages. Preferably identical orifice discs are employed.

Figure 3:
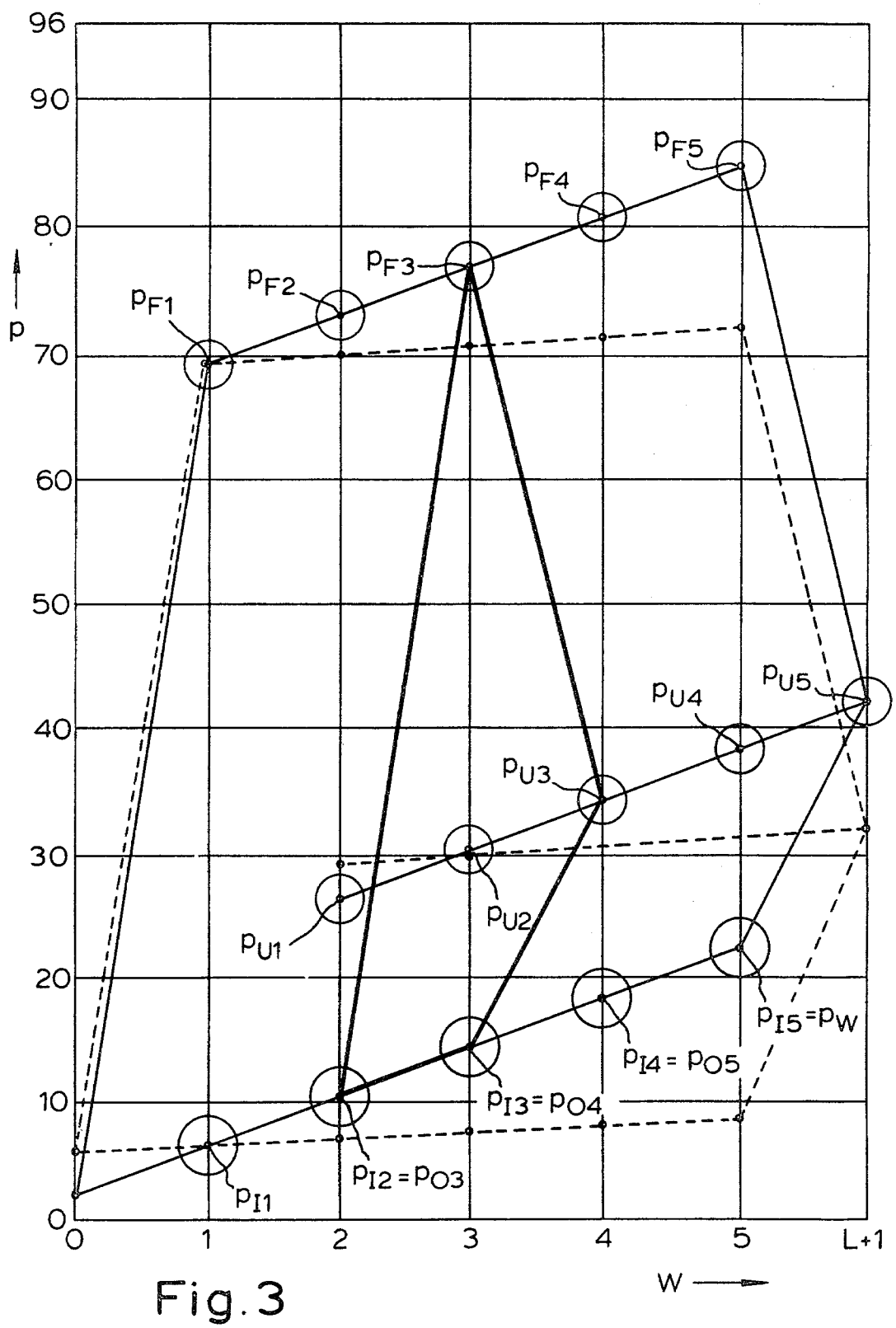
FIG. 3 is another pressure distribution graph.

FIG. 3 is a pressure distribution diagram, of the same kind as FIG. 2, of ideal pressure conditions for an installation of the type represented in FIG. 1 during the washing of corn starch, in the case that orifice discs are employed for increasing the liquid volume split in favour of the overflow stream in each hydrocyclone stage and thereby increasing its k value. In FIG. 4 the same symbols as in FIG. 2 are used to denote the various monitored pressures in the system. By employing the higher underflow pressures, involving a higher counterpressure in the hydrocyclones of each stage, a higher k value can be attained for a given maximum system pressure $P_{F5}$.

Another parameter affecting the instantaneous k value of the individual hydrocyclone stages is the pressure drop between the wash liquid injection point and the pressure of the first stage overflow stream. This pressure drop is determinative of a control current which passes back from the wash liquid injection point through the system stage by stage. An increase in the rate of injection of wash water increases that pressure drop which in turn has the effect of increasing the counterpressure in the individual hydrocyclone stages.

The invention will now be illustrated by an example of a process according to the invention performed for the washing of potato starch. In order to highlight the advantages of the invention in this performance thereof, the example (Example 2) is preceded by an example using certain conventional countercurrent washing installations, i.e., installations with no provision for partial recycling of the underflow stream from the final hydrocyclone stage.

EXAMPLE 1 (Comparative)

Table 1 below sets out certain design and performance specifications of 5 different totally enclosed continuous countercurrent hydrocyclone washing installations of conventional design and having a production capacity of 1m³ bone dry washed starch per hour. In accordance with recognised design practice the successive hydrocyclone stages, of which there are seven, incorporate different numbers of individual hydrocyclones (referred to as "cones"), the number increasing from stage to stage up to the penultimate stage and decreasing for the final stage. The five different installations differ from each other in regard to the difference (referred to as the "cone number increment") between the numbers of individual hydrocyclones in successive stages preceding the final one.

Each of the installations was fed with crude potato starch which was suspended in water, the volumetric concentration of the suspension being 0.26. Each installation was primed to operate at the most favourable underflow concentration (=0.26) and the minimum first stage overflow concentration (=0.031) for achieving the greatest probability of removing solid contaminations consistent with the highest attainable yield and quality of the washed starch.

Fresh washwater was introduced in each case at a rate corresponding with a washwater ratio (w) of 14.43, such washwater ratio being equal to the volume of wash water introduced into the final hydrocyclone stage divided by the bone dry volume of washed starch in the final stage underflow.

TABLE 1

| Cone number | Number of cones per stage | | | Theoretical dilution |
|---|---|---|---|---|
| increment | $N_1$ | $N_6$ | $N_7$ | factor $c_0$ |
| 1 | 83 | 88 | 81 | 7400 |
| 2 | 84 | 94 | 84 | 5100 |
| 3 | 84 | 99 | 87 | 3600 |
| 4 | 85 | 105 | 90 | 2700 |
| 5 | 85 | 110 | 93 | 2155 |

EXAMPLE 2

In this example a totally enclosed continuous counter-current hydrocyclone washing installation according to the present invention was used so as to perform a washing process also in accordance with the invention. The installation, like those used in Example 1, was a seven stage installation with a production capacity of 1 m³ of bone dry washed starch per hour. The installation was fed with a feedstock of the same composition and concentration as that employed in Example 1 and was primed to operate at the optimum underflow concentration (=0.26) and at the most favourable minimum overflow concentration (=0.031) so that the process was equivalent to those in Example 1 in regard to the removal of solid contaminations.

The following Table 2 gives the relevant design and performance data. The letter "m" where used in the Table denotes meters of water column.

TABLE 2

| | | | |
|---|---|---|---|
| Number of cones per stage | = 74 | | |
| Feedstock entry pressure | = 3.3 meters water column | | |
| Pressure drop between inlet side of pump $P_1$ and outlet side of pump $P_7$ | = 15 meters suspension column | | |
| Operating capacity (as a percentage of nominal production capacity) | | | |
| | 80% | 100% | 120% |
| Washwater ratio (w) | 16.5 | 12.7 | 10.15 |
| Actual washwater consumption in m³/hr | 13.2 | 12.7 | 12.18 |
| Theoretical overall dilution factor ($c_0$) | 21053 | 6663 | 2326 |
| Feed density | 1.057 | 1.062 | 1.066 |
| Dilution factor (k) per stage | 4.04 | 3.39 | 2.89 |
| Theoretical aggregate power consumption of the pumps | 8.16 | 8.25 | 8.34 |
| Pressure drop per stage (measured between inlet sides of successive pumps) | 1.83 m | 1.40 m | 1.0m |
| Pressure at inlet side of final pump (over atmospheric) | 14.3 m | 11.7 m | 9.3m |
| Maximum system pressure (pressure at outlet side of final pump) over atm. | 30.1 m | 27.6 m | 25.3m |

A comparison of the data in Table 2 with the data in Table 1 which relate to the installation with a cone number increment of 2 reveals inter alia the following advantages of the process and installation according to the invention:

The overall dilution factor which is a measure of the efficiency of removal of soluble contaminants is superior in the process according to the present invention: 6663 against 5100.

In the process according to Example 2 the washwater ratio is lower than in the conventional installation: 12.7 versus 14.43.

The number of individual hydrocyclones needed in any stage, which is determinative of the required multihydrocyclone sizes and capacities, is lower in the case of the Example 2. In that installation there are 74 individual hydrocyclones in each stage. In the conventional installation the number is much higher: there are 94 hydrocyclones in stage $N_6$ alone and as it is common practice for the maximum number of individual hydrocyclones needed in any stage to determine the type of multihydrocyclone which is chosen, a larger multihydrocyclone type is needed.

A further advantage of the process according to Example 2 is its lower power consumption: 8.25 HP/hour. The power consumption in the process according to Example 1 was 10.5 HP/hour.

The very high overall dilution factor of the Example 2 installation has already been mentioned. Even higher overall dilution can be achieved by using more hydrocyclone stages, a step which is facilitated by the fact that such further stages can be identical with the existing stages and can operate at precisely the same pressure drop per stage. The k-factor per stage being 3.39, each additional stage will improve the overall dilution by a factor of 3.39. An overall dilution of over one million can be achieved with a 12-stage installation.

In addition to the foregoing advantages the installation according to the invention is much easier to trim. In other words the settling up of the process to achieve the flow conditions giving an efficient balanced performance takes much less time.

As is known per se the individual hydrocyclone size employed in a countercurrent hydrocyclone washing installation should be selected with due regard to the sizes of the particles being washed. Many starch species, e.g. cornstarch granules, have considerably smaller particles than potato starch and consequently normally require hydrocyclones of smaller size and different pressure drops per washing stage.

I claim:

1. A process of upgrading a particulate starch product by subjecting it to a counter-current washing process with water in a system of hydrocyclones operating in cascade with introduction of wash water into the final stage, in order to remove contaminating substances, in which process a suspension of a starch product in water containing dissolved contaminants is fed continuously into the first of a plurality of hydrocyclone washing stages each of which operates to discharge an underflow stream and an overflow stream the former of which contains a higher proportion of the starch product particles than the overflow stream; the underflow stream from each stage except the last is pumped directly via a feed line into the next hydrocyclone stage, and the overflow stream from each hydrocyclone stage except the first is introduced into the feed-line to the previous hydrocyclone stage at a point at the inlet side of the pump in that line whereas the overflow stream from the first stage, which stream contains removed contaminants, is removed from the system; the whole series of hydrocyclone stages being operated as a totally enclosed system so that the different stages function interdependently; with the improvement that the final stage underflow stream which contains the washed starch product is in part directly removed from the system and in part recycled directly to that final stage by conducting that part into the feed-line to that stage at the inlet side of the pump in that feed-line.

2. A process according to claim 1, wherein the part of said final stage underflow stream which is recycled to that final stage is from 5 to 50% by volume of that underflow stream.

3. A continuous process of upgrading starch by washing it in counter-current with water in hydrocyclones, in which process a feedstock stream of water which contains starch particles in a concentration which varies in course of time, and which also contains dissolved contaminations, is fed continuously into the first while wash water is continuously fed into the last of a plurality of hydrocyclone washing stages which together form a cascade system wherein the different stages function interdependently, and each of which operates to discharge an underflow stream and an overflow stream the former of which contains a higher proportion of the product particles than the overflow stream; the underflow stream from each stage except the last is pumped directly via a feed-line into the next hydrocyclone stage and the overflow stream from each hydrocyclone stage except the first is introduced into the feed-line to the previous hydrocyclone stage at a point at the inlet side of the pump in that line whereas the overflow stream from the first stage, which stream contains removed contaminants, is removed from the system; with the improvement that a first part of the final stage underflow stream (which contains the washed starch) is removed from the system and a second part of that final stage underflow stream is recycled directly to that stage by conducting that part into the feed-line to that stage at the inlet side of the pump in that feed-line; and in course of the process the proportion of the final stage underflow stream which is recycled as said second part is varied in the event of variations in the concentration of the product particles in said feedstock stream thereby to assist trimming of the system to the changed conditions.

4. A process according to claim 3, wherein said hydrocyclone stages have substantially the same throughput capacity.

* * * * *